(12) United States Patent
Neujahr (10) Patent No.: US 7,282,646 B2
(45) Date of Patent: Oct. 16, 2007

(54) WIRE SUPPORT

(75) Inventor: Steven Neujahr, St. Paul, MN (US)

(73) Assignee: Professional Partners, Ltd., St. Paul, MN (US)

( * ) Notice: Subject to any disclaimer, the term of this patent is extended or adjusted under 35 U.S.C. 154(b) by 0 days.

(21) Appl. No.: 11/063,123

(22) Filed: Feb. 22, 2005

(65) Prior Publication Data

US 2006/0185887 A1 Aug. 24, 2006

(51) Int. Cl.
*H01B 7/00* (2006.01)

(52) U.S. Cl. .................... 174/135; 174/53; 174/58; 174/54; 211/60.1; 220/3.2

(58) Field of Classification Search .............. 174/53, 174/57, 58, 135, 54, 55; 211/60.1; 220/3.2, 220/3.3; 248/68.1, 70; 361/826; 439/535
See application file for complete search history.

(56) References Cited

U.S. PATENT DOCUMENTS

| | | | |
|---|---|---|---|
| 3,084,958 A * | 4/1963 | Apppleton | ............ 285/189 |
| 3,495,276 A | 2/1970 | Suess | |
| 3,585,273 A | 6/1971 | Paul | |
| 3,616,096 A | 10/1971 | Roeder | |
| 3,620,404 A | 11/1971 | Grasso | |
| 4,265,365 A | 5/1981 | Boteler | |
| 4,408,695 A | 10/1983 | Balkwill et al. | |
| 4,538,782 A * | 9/1985 | Kirschenbaum | ........... 248/68.1 |
| 4,626,617 A | 12/1986 | Rye | |
| 4,649,230 A | 3/1987 | Nielsen | |
| 4,673,097 A | 6/1987 | Schuldt | |
| 4,724,281 A | 2/1988 | Nix et al. | |
| 4,757,158 A | 7/1988 | Lentz | |
| 4,794,207 A | 12/1988 | Norberg et al. | |
| 4,952,754 A | 8/1990 | Rye | |
| 5,011,033 A | 4/1991 | Roth | |
| 5,084,596 A | 1/1992 | Borsh et al. | |
| 5,191,171 A | 3/1993 | Bordwell | |
| 5,316,246 A * | 5/1994 | Scott et al. | ............ 248/68.1 |
| 5,397,093 A | 3/1995 | Chubb et al. | |
| 5,421,457 A | 6/1995 | Listenberger | |
| 5,444,183 A | 8/1995 | Gehrs et al. | |
| 5,448,012 A | 9/1995 | Jacob | |
| 5,463,533 A | 10/1995 | Donnerstag | |
| 5,476,183 A | 12/1995 | Harpenau | |

(Continued)

FOREIGN PATENT DOCUMENTS

GB 2355593 A 4/2001

*Primary Examiner*—Dhiru R. Patel
(74) *Attorney, Agent, or Firm*—Crompton, Seager & Tufte LLC (57) ABSTRACT

Apparatus and systems for holding and locating one or more wires within a structure are disclosed. A wire support in accordance with the present invention may include a foldable or bendable body including one or more apertures configured to receive an elongated member therethrough. The wire support may include mounting tabs for attaching the wire support to a structural member such as a wall stud or ceiling joist. The mounting tabs may includes several arcuate-shaped flaps adapted to bend or flex about the ends of the body. In use, the wire support can be configured to attach to a structure in a generally flat configuration, or may be folded or bent to a desired shape such as a polyhedron or an L.

42 Claims, 8 Drawing Sheets

U.S. PATENT DOCUMENTS

| | | | |
|---|---|---|---|
| 5,571,993 A | 11/1996 | Jones et al. | |
| 5,573,321 A | 11/1996 | Bell, Jr. | |
| 5,721,394 A | 2/1998 | Mulks | |
| 5,744,753 A | 4/1998 | Nattel | |
| 5,837,933 A | 11/1998 | Fligelman | |
| 5,839,868 A * | 11/1998 | Kloian | 411/533 |
| 5,971,329 A * | 10/1999 | Hickey | 248/68.1 |
| 6,031,181 A | 2/2000 | Jacks | |
| 6,170,784 B1 * | 1/2001 | MacDonald et al. | 248/65 |
| 6,194,657 B1 | 2/2001 | Gretz | |
| 6,207,897 B1 * | 3/2001 | Reiker | 174/58 |
| 6,290,190 B1 | 9/2001 | Kendall | |
| 6,375,128 B1 * | 4/2002 | Condon et al. | 248/57 |
| 6,395,981 B1 | 5/2002 | Ford et al. | |
| 6,419,102 B1 | 7/2002 | Harpenau | |
| 6,423,898 B1 * | 7/2002 | Croker | 174/50 |
| 6,437,241 B1 | 8/2002 | Neujahr | |
| 6,501,021 B1 * | 12/2002 | Greene et al. | 174/58 |
| 6,556,762 B1 * | 4/2003 | Erickson et al. | 385/134 |
| 6,585,551 B2 * | 7/2003 | McClung et al. | 446/46 |
| 6,824,188 B1 * | 11/2004 | Brown et al. | 296/97.2 |
| 6,839,244 B1 * | 1/2005 | Rood | 361/826 |
| 6,926,537 B1 * | 8/2005 | Auchincloss et al. | 439/67 |
| 7,039,965 B1 * | 5/2006 | Ismert | 248/68.1 |
| 7,091,418 B1 * | 8/2006 | Clark et al. | 174/135 |

* cited by examiner

WIRE SUPPORT

FIELD OF THE INVENTION

The present invention relates generally to components for building construction. More specifically, the present invention relates to wire supports for holding and locating electrical wires.

BACKGROUND OF THE INVENTION

The installation of loudspeakers, keypads, thermostats, security monitors, telephones, and other low-voltage electrical devices in homes and offices frequently involves the installation of wire within a wall, ceiling, receptacle, or other building structure. In a typical installation, wire is fed to a particular location within the structure and mounted to one or more structural members (e.g. wall studs or ceiling joists). Once mounted, the structural members are then covered with a barrier such as a panel of drywall, plaster, wood, gypsum board, or acoustic tile. Subsequent access to the wire requires the worker to knock out a portion of the barrier, locate the end of the wire, and pull the wire through the opening formed in the barrier to connect the wire to the electrical device.

In modern construction, it is not uncommon to pre-wire an entire building or structure in anticipation of the occupant's future expansion and installation needs. For example, many new homes are frequently pre-wired to permit future installation of a home entertainment system. To accomplish this task, a considerable amount of wire may need to be fed to various locations within the house and stored for subsequent use. If the wire is not placed in a manner that facilitates locating the end of the wire, or if the wire becomes buried or entangled within the structure, installation of the system may be difficult or unfeasible. To facilitate installation, therefore, it is desirable to provide a quick and inexpensive way to store and locate wire within the structure for easy access in the future.

SUMMARY OF THE INVENTION

The present invention relates to wire supports for holding and locating electrical wires within a frame or receptacle. A wire support in accordance with an exemplary embodiment of the present invention comprises a body having a first end, a second end, and two sides. The body may include one or more perf-cuts, each comprising a plurality of perforations. The body can be attached to the structure in a generally flat configuration, or may be folded or bent to a desired shape such as a polyhedron or L. One or more apertures on the body are each adapted to receive a wire therethrough. In certain embodiments, the one or more apertures may be formed in a starburst pattern, and may be configured to frictionally engage the wire when inserted. The body may further include one or more sets of mounting tabs extending outwardly from the ends of the body. Each set of mounting tabs may comprise several arcuate-shaped flaps adapted to bend or flex about the ends of the body. In use, the mounting tabs can be used to secure the wire support to the structure.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
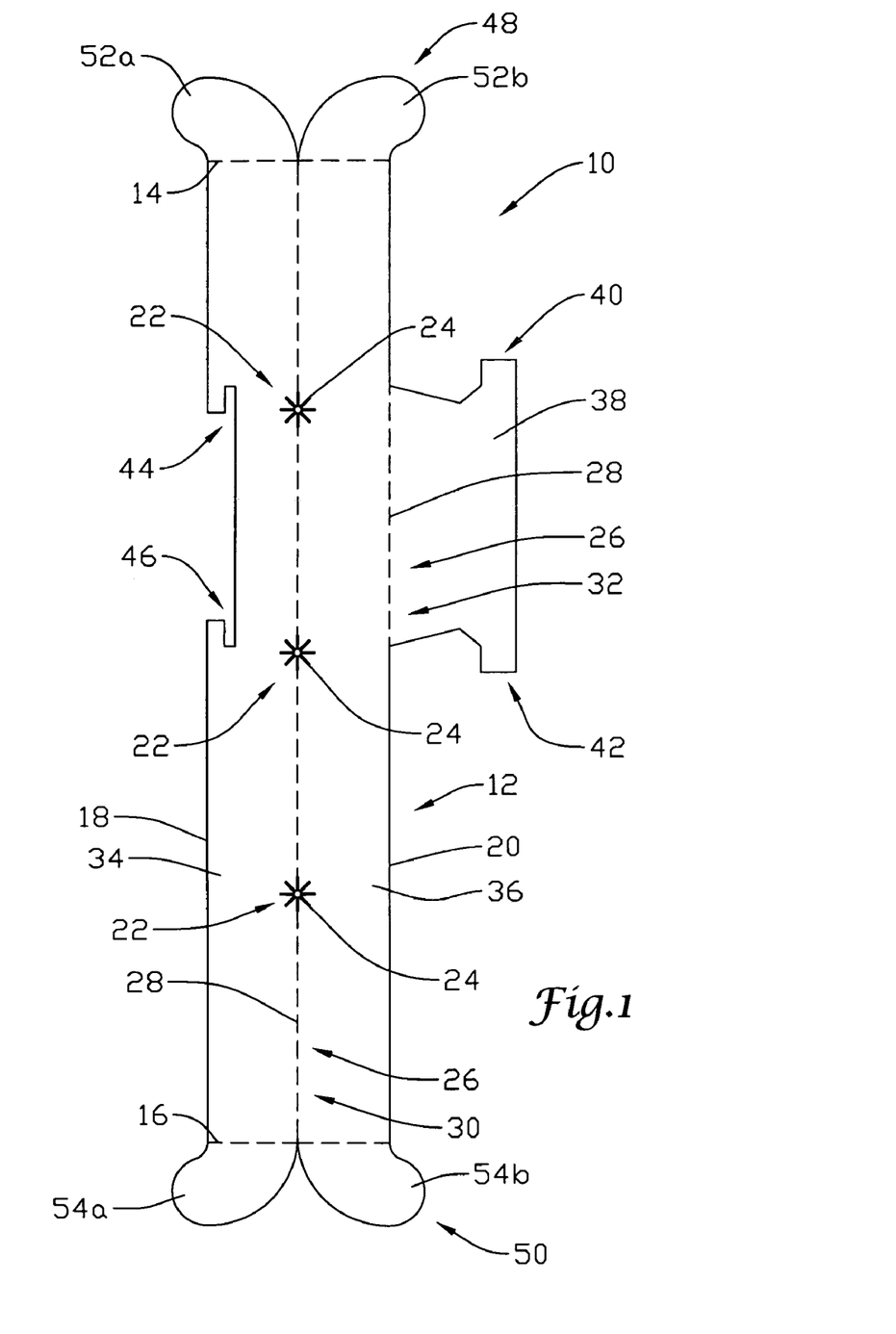
FIG. 1 is a plan view of a wire support in accordance with an exemplary embodiment of the present invention.

FIG. 1 is a plan view of a wire support 10 in accordance with an exemplary embodiment of the present invention. Wire support 10 comprises a body 12 having a first end 14, a second end 16, and two sides 18, 20. Body 12 may be formed of corrugated Kraft paper, cardboard, high-density paper, or other suitable material sufficiently rigid to support one or more wires within a wall, ceiling, receptacle, or other building structure. As is discussed in greater detail with respect to FIGS. 2-7, wire support 10 can be utilized to hold and locate a wire, cable, conduit or other elongated member at various locations and positions within the structure. Depending on the application, the body 12 may be configured to attach to the structure in a generally flat configuration, or may be folded or bent to a desired shape such as a polyhedron or an L.

Body 12 defines one or more apertures 22 therethrough adapted to allow the elongated member to pass therethrough. Each aperture 22 comprises a plurality of slits 24 configured to displace when the elongated member is advanced through the aperture 22. The slits 24 may be formed in a starburst pattern, and may be configured to frictionally engage the elongated member once inserted through the aperture 22. In some embodiments, for example, the dimensions of each aperture 22 can be selected to grip a particular size of wire (e.g. a 14 gauge speaker wire) to prevent the wire from slipping through the aperture 22 unless pulled by the installer.

Body 12 further defines one or more perf-cuts 26 each comprising a plurality of perforations 28. The perforations 28 form a bending line about which body 12 can be bent or folded. The one or more perf-cuts 26 can be aligned on body 12 along the same line as the one or more apertures 22, as shown in FIG. 1, or can be placed along a line offset from the one or more apertures 22.

In the exemplary embodiment illustrated in FIG. 1, body 12 defines a first perf-cut 30 and a second perf-cut 32. The first perf-cut 30 is disposed between a first panel 34 and a second panel 36 of body 12. The second perf-cut 32 is disposed between the second panel 36 and a third panel 38 of body 12. A first tab 40 and second tab 42 on the third panel 38 are adapted to interlock, respectively, with a first slot 44 and second slot 46 on the first panel 34. The first tab 40 is adapted to seat against the first panel 34 proximate the first slot 44. The second tab 42 is adapted to seat against the first panel 34 proximate the second slot 46. In use, body 12 can be bent or folded along the first and/or second perf-cuts 30,32 to assume a desired shape. For example, body 12 can be bent about the first and second perf- cuts 30,32 to form a polyhedron. The tabs 40,42 can be inserted into the slots 44,46 to maintain the shape of the folded body 12.

Body 12 further defines a first set of mounting tabs 48 extending outwardly from the first end 14 of body 12, and a second set of mounting tabs 50 extending outwardly from the second end 16 of body 12. The first and second set of mounting tabs 48,50 each comprise several flaps 52a, 52b, 54a, 54b having an arcuate (i.e. rabbit ear) shape. The flaps 52a, 52b, 54a, 54b are adapted to bend or flex about the ends 14,16 of body 12. In certain applications, for example, the flaps 52a, 52b, 54a, 54b can be bent to lie flush with the surface to be engaged. A staple, nail, rivet, screw, or other fastener can be used to secure the first and/or second set of mounting tabs 48,50 to the structure.

Referring now to FIGS. 2-7, methods of using a wire support in accordance with the present invention will now be described in the context of wire holder 10 described above. Although wire support 10 is illustrated in the various figures, it is to be understood that a wire support in accordance with any embodiment of the present invention can be employed. While wire support 10 is shown attached to such structural members as walls studs, ceiling joists, corner frames, and/or receptacles, other applications have been contemplated. For example, a wire support in accordance with the present invention may be used to hold and locate wire within an enclosure such as a speaker cabinet to assist in the installation of wire to the speaker drivers.

Figure 2:
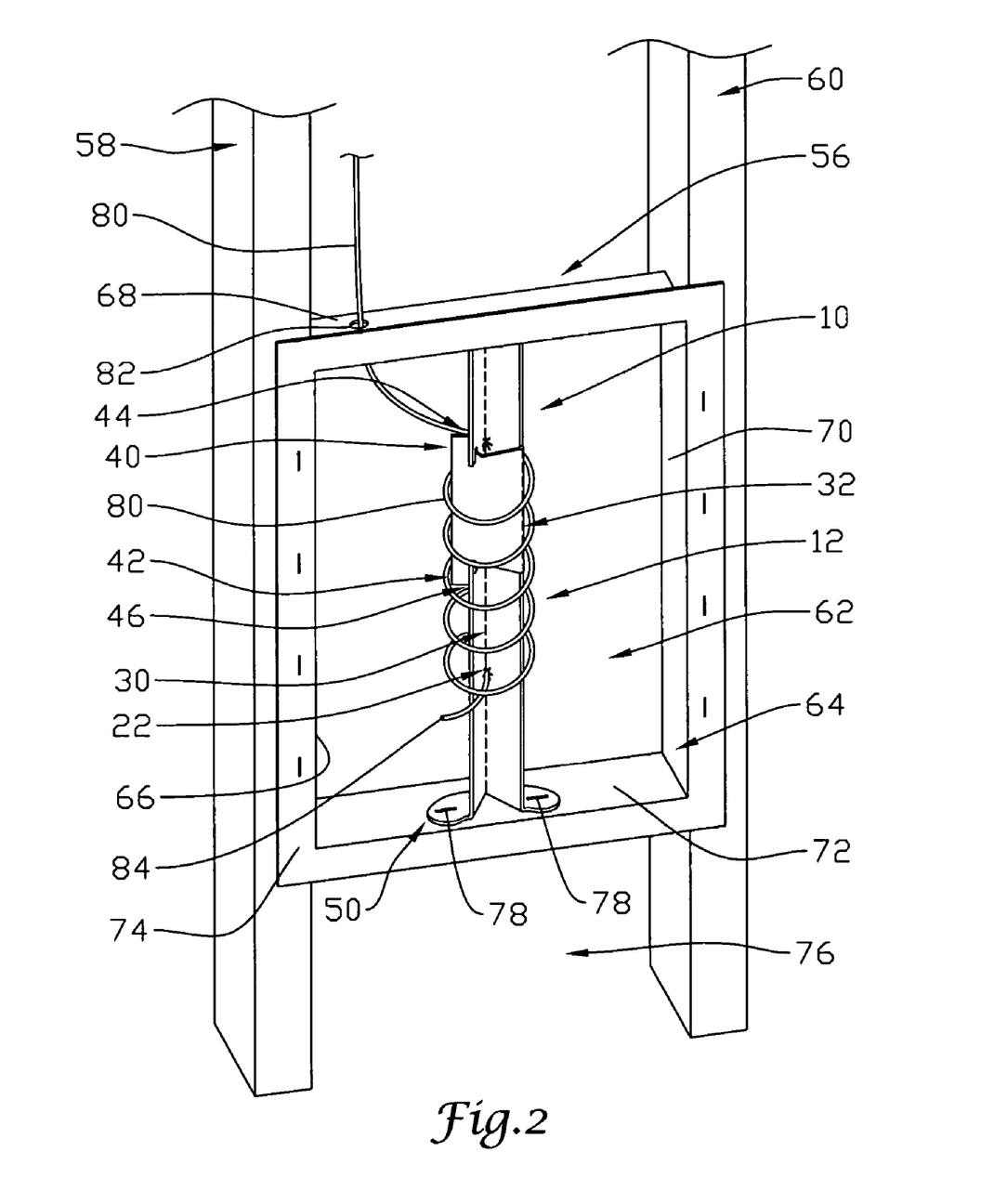
FIG. 2 is a perspective view of the wire support of FIG. 1, showing the wire support in a folded configuration attached within a receptacle.

FIG. 2 is a perspective view showing the wire holder 10 folded in a generally polygonal shape and secured within a receptacle 56 disposed between two structural members 58,60. Receptacle 56 comprises a base wall 62 and a perimeter wall 64. The perimeter wall 64 comprises a first side wall 66, a second side wall 68, a third side wall 70, and a fourth side wall 72. The base wall 62 and perimeter wall 64 together form an enclosure within a wall or ceiling configured to receive an electrical device.

The receptacle 56 may include a flange wall 74 configured to mount the receptacle 56 within the space 76 located between the two structural members 58,60. The flange wall 74 lies along a plane substantially perpendicular to the perimeter wall 64, and mounts flush with the surface of the barrier (e.g. a panel of drywall) covering the wall or ceiling. Several staples may be used to attach the flange wall 74 to the structural members 58,60.

Wire support 10 may be placed within receptacle 56, and fixedly secured thereto using either or both sets of mounting tabs 48,50. The body 12 may be folded along the first and second perf-cuts 30,32 into a generally polygonal shape to form a polyhedron. The tabs 40,42 can be inserted into the slots 44,46 to maintain the shape of the folded body 12. The first set of mounting tabs 48 may be bent to lie flush with the second side wall 68 of receptacle 56. The second set of mounting tabs 50 may also be bent to lie flush with the fourth side wall 72 of receptacle 56. The first and second set of mounting tabs 48,50 can be secured to the second and fourth side walls 68,72 using several fasteners 78. In the exemplary embodiment illustrated in FIG. 2, the fasteners 78 are depicted as staples, however, it should be understood that other fasteners could be employed. For example, fasteners 78 could be screws, nails, or rivets.

Figure 6:
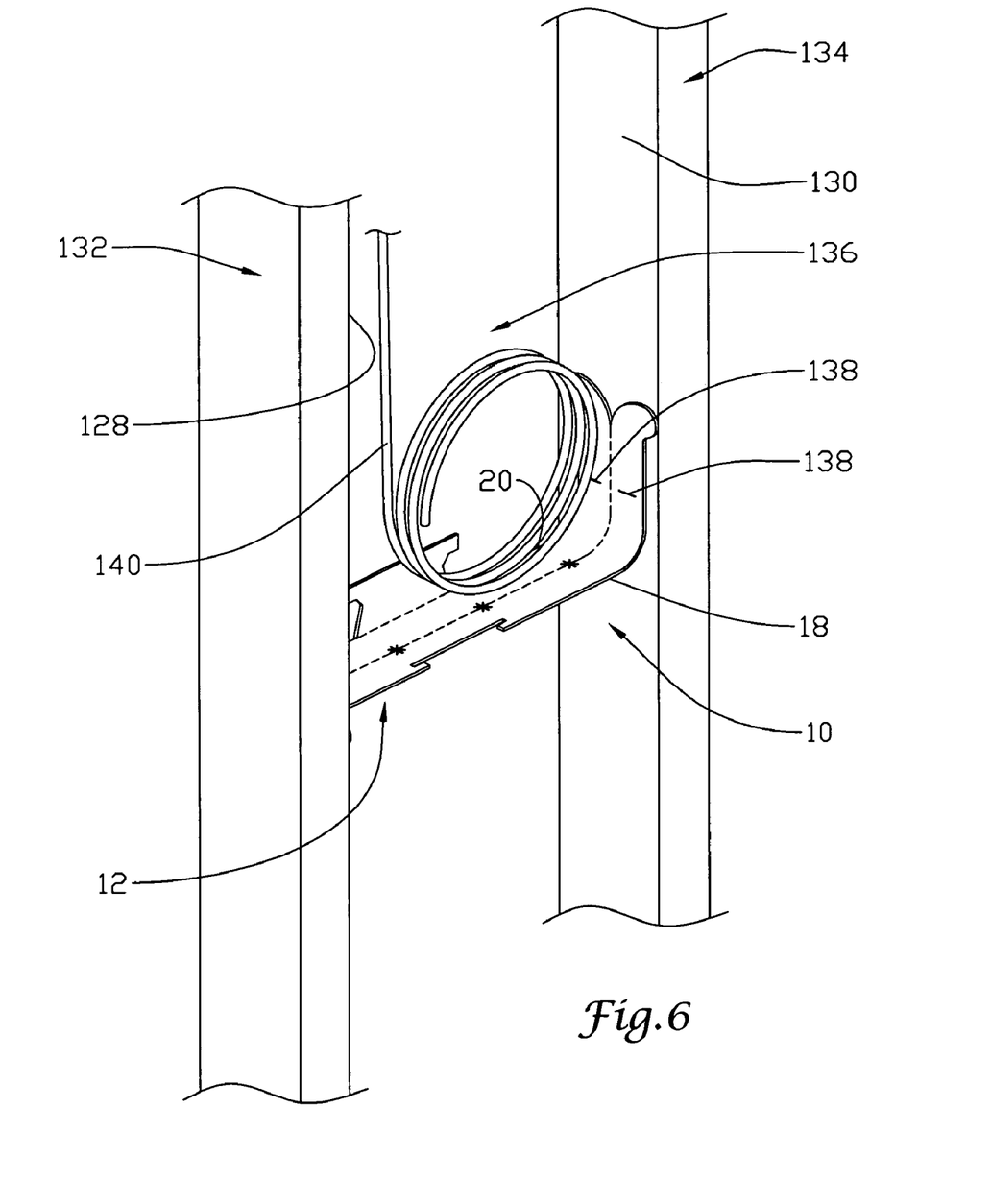
FIG. 6 is a perspective view of the wire holder of FIG. 1, showing the wire support in a bent configuration attached between two structural members.

A wire 80 can be passed through an aperture 82 on the receptacle 56 and placed into contact with the wire support 10. As shown in FIG. 6, the wire 80 may be coiled about the wire support 10 to hold the wire 80 within the receptacle 56. The end 84 of the wire 80 may be inserted through one of the apertures 22 on body 12 with a sufficient amount of slack to allow the installer to pull the wire end 84 through the barrier, as necessary.

Once the wire 80 has been placed on the wire support 10, a panel of drywall, plaster, wood, gypsum board, acoustic tile, or other suitable barrier can be used to cover the receptacle 56 and structural members 58,60. To install the electrical device, the installer first locates the wire 80 within the wall using, for example, a wire sensor, and then creates an opening through the barrier to expose the wire 80. The wire 80 can then be connected to the electric device.

Figure 3:
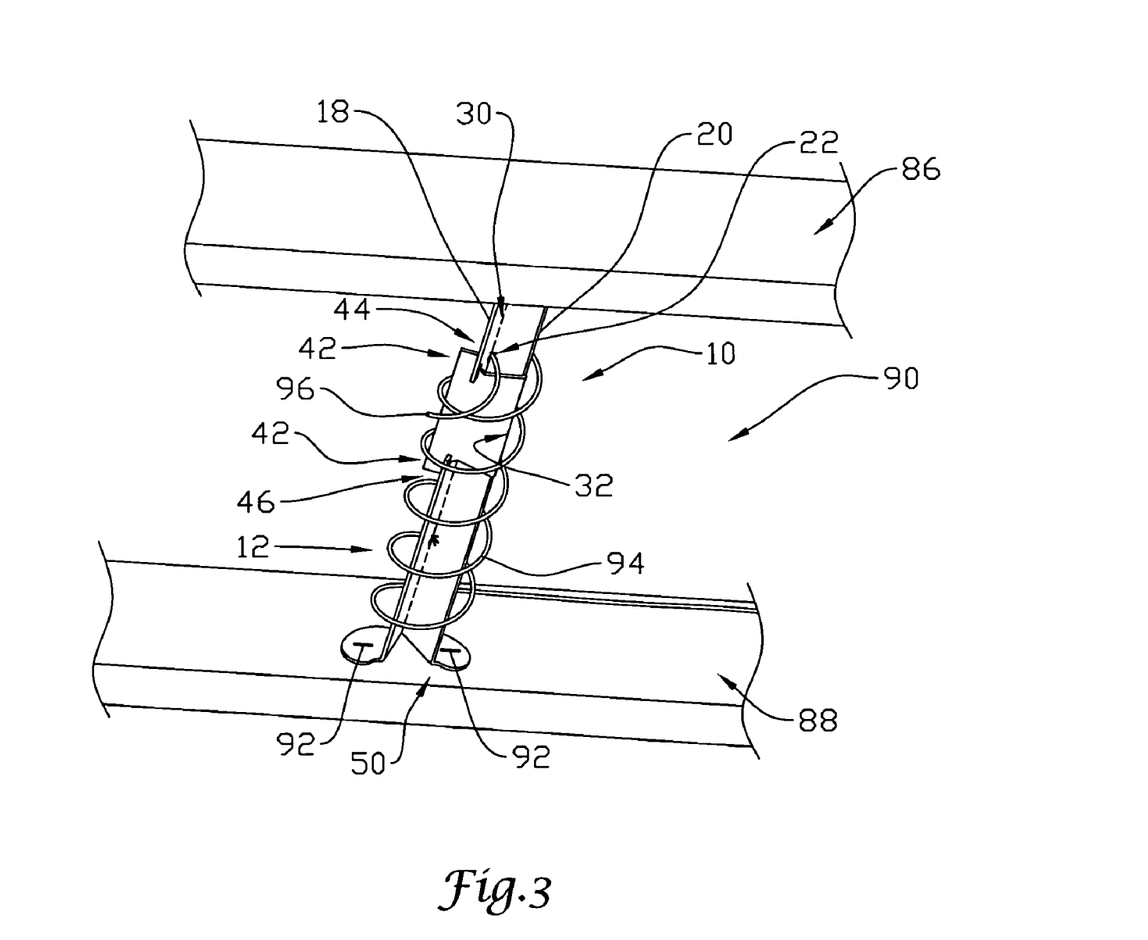
FIG. 3 is a perspective view of the wire support of FIG. 1, showing the wire support in a folded configuration attached between two structural members.

FIG. 3 is a perspective view showing the wire support 10 in a folded configuration attached between two structural members 86,88. As with the system illustrated in FIG. 2, body 12 may be folded along the first and second perf-cuts 30,32, and tabs 40,42 can be inserted into the slots 44,46, to maintain the shape of the folded body 12.

The body 12 can be dimensioned to fit within the space 90 between the two structural members 86,88. For example, the length of the two sides 18,20 of body 12 may be selected such that wire support 10 will fit between structural members placed on 12, 16 or 24 inch centers, corresponding to distances commonly used in the art for wall studs and ceiling joists.

Wire support 10 can be fixedly secured to the two structural members 86,88 using either or both sets of the mounting tabs 48,50. The mounting tabs 48,50 may be bent to lie flush with the surface of the structural members 86,88 and secured thereto using several staples 92 or other suitable fasteners. As shown in FIG. 3, a wire 94 can be coiled about the wire support 10 to hold the wire 94 within space 90. The end 96 of the wire 94 can be fed through one of the apertures 22 with a sufficient amount of slack to allow the installer to pull wire 94 through the barrier during installation.

Figure 4:
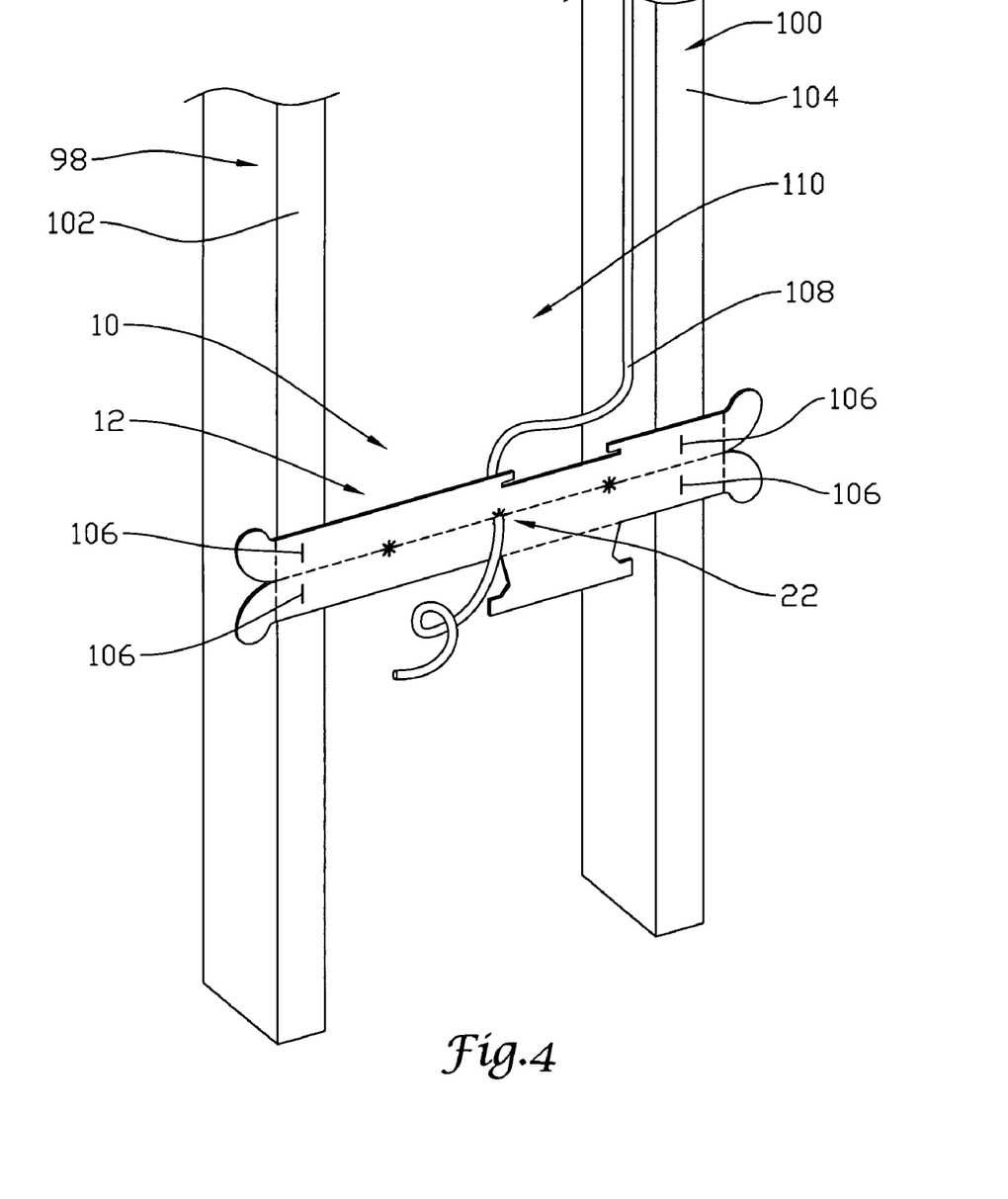
FIG. 4 is a perspective view of the wire support of FIG. 1, showing the wire support in a generally flat configuration attached to two structural members.

FIG. 4 is a perspective view showing the wire support 10 attached in a generally flat configuration to two structural members 98,100. In the particular application illustrated in FIG. 4, wire support 10 is shown attached to the edges of 102,104 of each structural member 98,100 such that body 12 will lie flush with the barrier when installed. The wire support 10 can be attached to the edges 102,104 using several staples 106 or other suitable fasteners.

One or more wires 108 may be fed through the space 110 formed by structural members 98,100 and inserted through one or more of the apertures 22 on body 12. The wire support 10 can be oriented in a direction substantially perpendicular to the structural members 98,100, such that the one or more apertures 22 are level horizontally, as shown in FIG. 4. In an alternative embodiment, the wire support 10 can be oriented at an angle relative to the structural members 98,100 such that the one or more apertures 22 are positioned at different vertical locations along the structure. In yet another alternative embodiment, the wire support 10 can be attached to a single structural member (e.g. a wall stud or ceiling joist) and positioned such that the one or more apertures 22 are leveled vertically.

Figure 5:
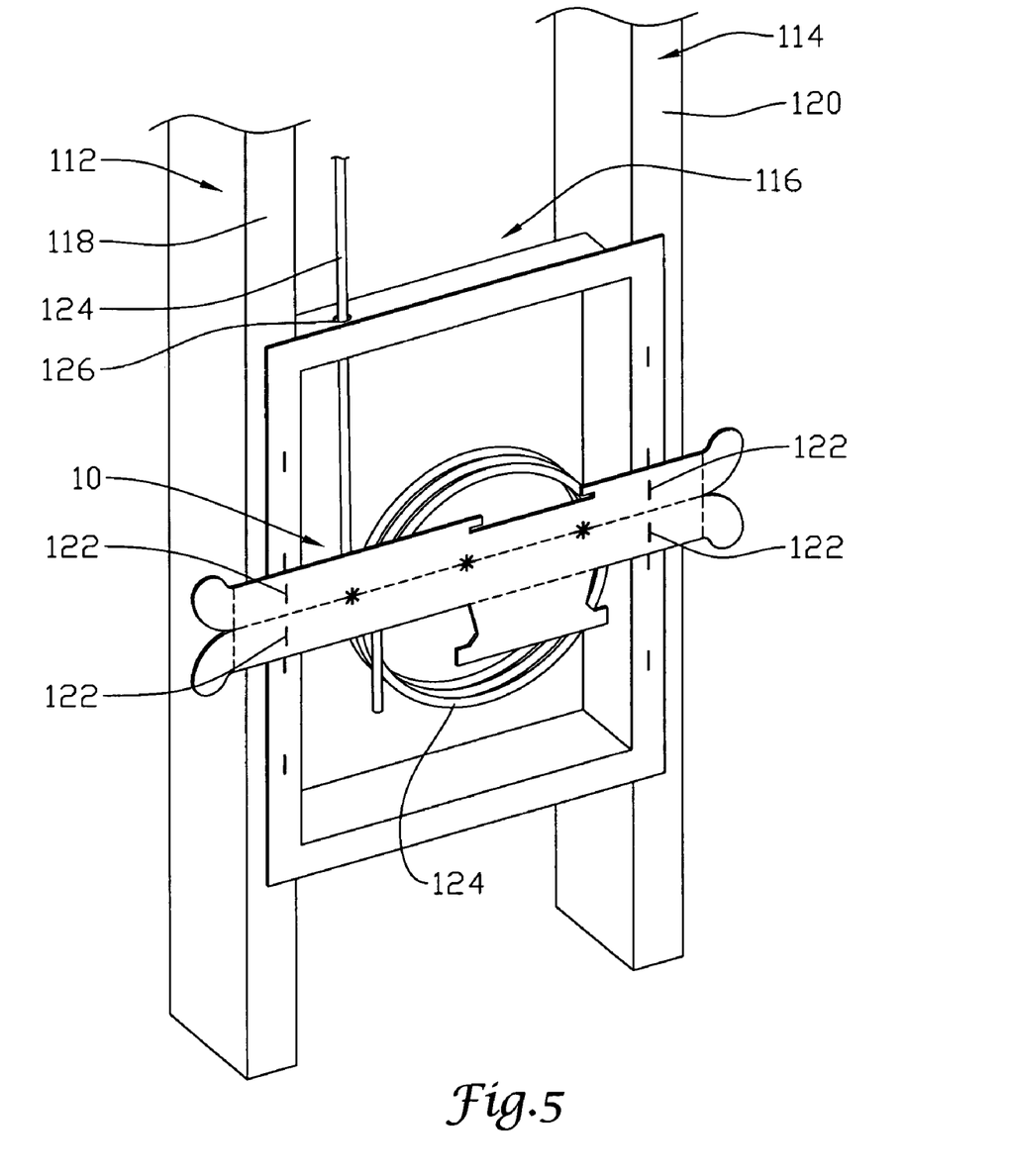
FIG. 5 is a perspective view of the wire support of FIG. 1, showing the wire support attached in a generally flat configuration to two structural members adjacent a receptacle.

FIG. 5 is a perspective view showing the wire support 10 in a generally flat configuration attached to two structural members 112,114 adjacent an enclosure 116 similar to that illustrated in FIG. 2. The wire support 10 can be attached to the edges 118,120 and the receptacle 116 using several staples 122 or other suitable fasteners. One or more wires 124 may be fed through an aperture 126 on the receptacle 116, looped in a coil, and then taped, tied, stapled or otherwise connected to the wire support 10 for subsequent installation. For example, one or more wires may be formed into a loop and set on or taped to wire support 10. In another example, one or more wires may be looped through an aperture on the wire support or an end of a wire coil may protrude through the wire support to fix the coil to the wire support.

FIG. 6 is a perspective view showing the wire support 10 in a bent configuration attached to the inner wall 128,130 of two structural members 132,134. In the embodiment illustrated in FIG. 6, the length of body 12 is longer than the distance between the two structural members 132,134. To fit the wire support 10 within the space 136 between the two structural members 132,134, body 12 may be bent or creased about a line substantially perpendicular to its two sides 18,20. Wire support 10 can be attached to the two structural members 132,134 with a plurality of staples 138 or other suitable fasteners. One or more wires 140 extending through space 136 may be coiled above or below the wire support 10, and temporarily bundled using a zip-tie, tape, or the like.

Figure 7:
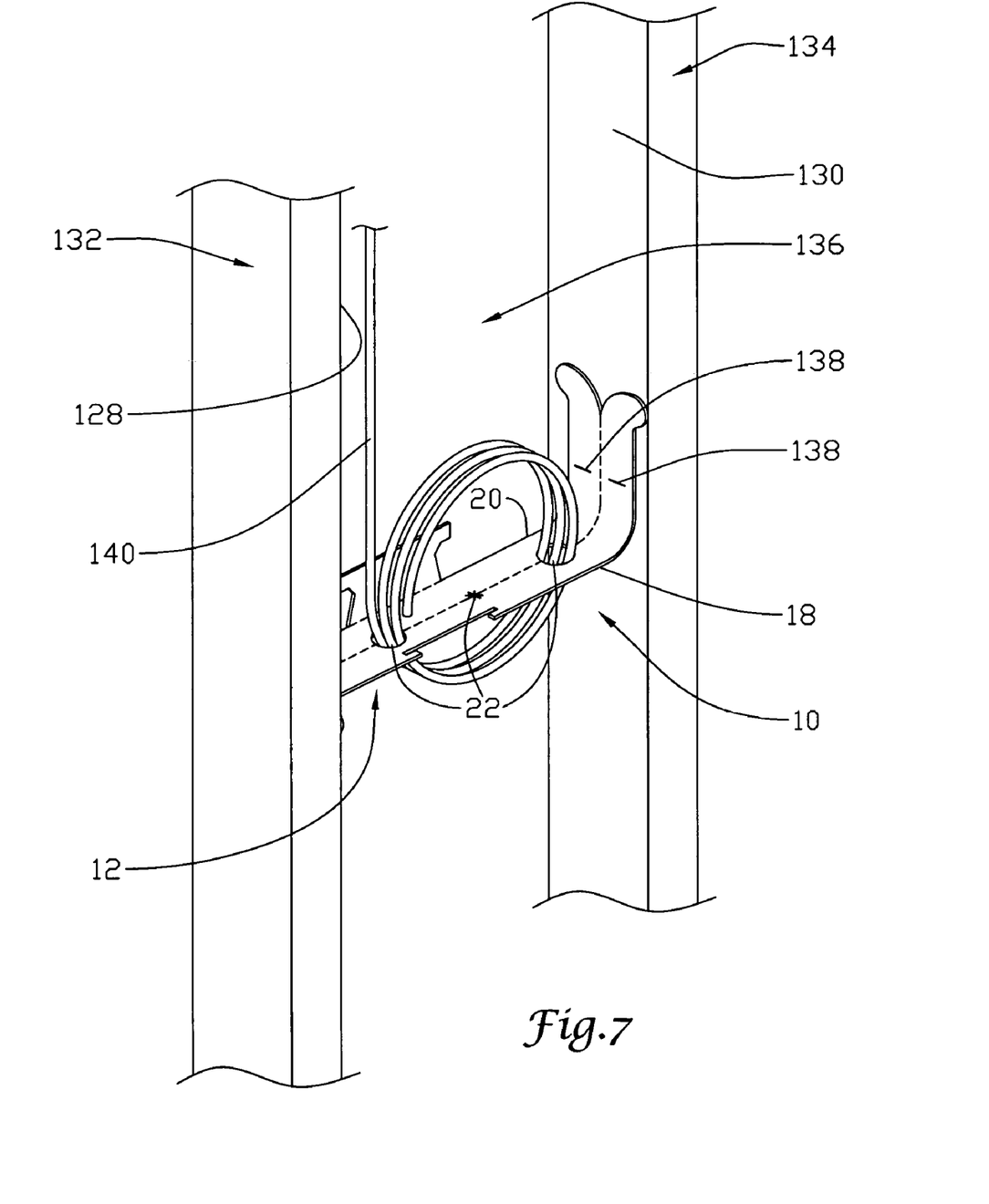
FIG. 7 is a perspective view of the wire holder of FIG. 1, showing the wire support in a bent configuration attached between two structural member.

FIG. 7 is a perspective view showing the wire support 10 in a bent configuration attached to the inner wall 128, 130 of two structural members 132, 134 in a manner similar to that of FIG. 6. One or more wires 140, or one or more loops of a wire 140 may be coiled or otherwise disposed through apertures 22 of wire support 10.

Figure 8:
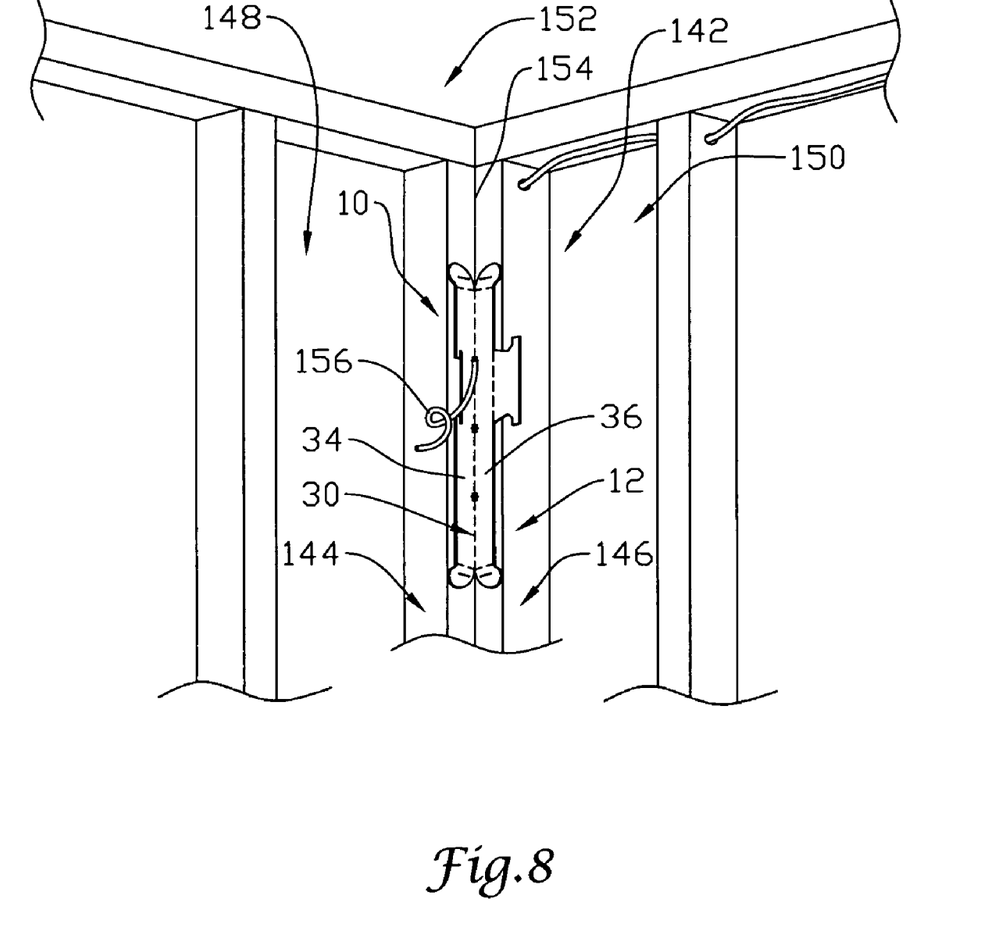
FIG. 8 is a perspective view of the wire support of FIG. 1, showing the wire support in a bent configuration attached to a corner frame.

FIG. 8 is a perspective view showing the wire support 10 in a bent configuration attached to a corner frame 142. Corner frame 142 defines a first structural member 144, and a second structural member 146. The first and second structural members 144,146 are disposed orthogonally to each other, and are used to connect two adjoining walls 148, 150 to a ceiling 152.

To connect the wire support 10 to the two structural members 144,146, body 12 may be bent along the first perf-cut 30 and attached such that the first panel 34 lies flush with the edge of the first structural member 144 while the second panel 36 lies flush with the edge of the second structural member 146. The first perf-cut 30 can be attached in an L-shaped configuration along the line 154 where the two structural members 144,146 meet. Wire support 10 can be connected to the first and second structural members 144,146 by any number of suitable fastener means, including several staples placed through the first and second panels 34, 36 of body 12 and/or through the use of the mounting tabs 48,50. A wire 156 can be inserted through the apertures 22 on body 12 and pulled a small distance, allowing the installer to grasp the wire 156 during installation.

What is claimed is:

1. A wire support, comprising:
    a body having a first end and a second end, said body further having one or more panels;
    one or more apertures through said body configured to receive an elongated member therethrough;
    a first mounting tab extending from said first end of said body; and
    a second mounting tab extending from said second end of said body;
    wherein said body further comprises one or more perf-cuts;
    wherein each of said one or more perf-cuts are aligned with said one or more apertures.

2. The wire support of claim 1, wherein each of said one or more apertures comprises a plurality of slits.

3. The wire support of claim 2, wherein said plurality of slits are formed in a starburst pattern.

4. The wire support of claim 2, wherein said plurality of slits are adapted to frictionally engage the elongated member.

5. The wire support of claim 1, wherein said elongated member is a wire.

6. The wire support of claim 1, wherein said body comprises corrugated Kraft paper.

7. The wire support of claim 1, wherein said body comprises cardboard.

8. The wire support of claim 1, wherein said body comprises high-density paper.

9. The wire support of claim 1, wherein said one or more panels comprises a plurality of panels.

10. The wire support of claim 9, wherein said plurality of panels can be bent such that said body assumes an L shape.

11. The wire support of claim 9, wherein said plurality of panels can be folded such that said body forms a polyhedron.

12. The wire support of claim 1, wherein each of said one or more perf-cuts comprises a plurality of perforations.

13. The wire support of claim 1, wherein each of said first and second mounting tabs comprises an arcuate-shaped flap.

14. The wire support of claim 13, wherein said arcuate-shaped flaps are adapted to bend relative to said body.

15. The wire support of claim 1, wherein said body includes a set of locking tabs configured to interlock with a set of slots.

16. A wire support, comprising:
    a body having a first end and a second end, said body further having one or more panels;
    one or more apertures through said body configured to receive an elongated member therethrough;
    a first mounting tab extending from said first end of said body; and
    a second mounting tab extending from said second end of said body;
    wherein said body includes a set of locking tabs configured to interlock with a set of slots.

17. A wire support, comprising:
    a body having a first end and a second end, said body including a first panel, a second panel, a third panel, and one or more apertures configured to receive an elongated member therethrough;
    a first perf-cut disposed between the first and second panels, said first perf-cut comprising one or more perforations configured to permit bending of the first panel relative to the second panel;
    a second perf-cut disposed between the second and third panels, said second perf-cut comprising one or more perforations configured to permit bending of the second panel relative to the third panel;
    a plurality of mounting tabs extending from at least one of said first end and said second end of said body; and
    one or more apertures, said one or more apertures aligned with the first perf-cut.

18. A wire support, comprising:
    a body having a first panel, a second panel, a third panel, and one or more apertures configured to receive an elongated member therethrough;
    a first perf-cut disposed between the first and second panels, said first perf-cut comprising one or more perforations configured to permit bending of the first panel relative to the second panel;
    a second perf-cut disposed between the second and third panels, said second perf-cut comprising one or more perforations configured to permit bending of the second panel relative to the third panel; and one or more sets of mounting tabs, each set comprising several arcuate-shaped flaps bendable relative to said body.

19. A wire support, comprising:

a body having a first end, a second end, and two sides;

one or more apertures through said body configured to receive an elongated member therethrough;

a first set of mounting tabs extending from the first end of said body; and a second set of mounting tabs extending from the second end of said body;

wherein each of said one or more apertures comprises a plurality of slits.

20. The wire support of claim 19, wherein said plurality of slits are formed in a starburst pattern.

21. A wire support, comprising:

a body having a first end, a second end, and two sides;

one or more apertures through said body configured to receive an elongated member therethrough;

a first set of mounting tabs extending from the first end of said body, said first set of mounting tabs comprising several arcuate-shaped flaps; and a second set of mounting tabs extending from the second end of said body, said second set of mounting tabs comprising several arcuate-shaped flaps.

22. A wire support system, comprising:

an elongated member;

a wire support comprising a body having a first end and a second end, said wire support including one or more apertures configured to receive the elongated member therethrough; and one or more sets of mounting tabs extending from at least one of said first end and said second end, said one or more sets of mounting tabs configured to secure the wire support to a structure;

wherein said wire support includes a set of locking tabs configured to interlock with a set of slots.

23. The wire support system of claim 22, wherein said elongated member is a wire.

24. The wire support system of claim 22, wherein said elongated member is a wire coil.

25. The wire support system of claim 22, wherein said body includes one or more perf-cuts.

26. The wire support system of claim 25, wherein each of said one or more perf-cuts comprises one or more perforations.

27. The wire support system of claim 22, wherein each of said one or more sets of mounting tabs comprises several arcuate-shaped flaps.

28. The wire support system of claim 27, wherein said arcuate-shaped flaps are adapted to bend relative to said body.

29. The wire support system of claim 22, further comprising fastener means for fastening said one or more sets of mounting tabs to said structure.

30. The wire support system of claim 29, wherein said fastener means are staples.

31. The wire support system of claim 22, wherein each of said one or more apertures comprises a plurality of slits.

32. The wire support system of claim 31, wherein said plurality of slits are formed in a starburst pattern.

33. The wire support system of claim 31, wherein said plurality of slits are adapted to frictionally engage the elongated member.

34. The wire support system of claim 22, wherein said wire support is configured to attach to said structure in a generally flat configuration.

35. The wire support system of claim 22, wherein said wire support is configured to attach to said structure in a bent configuration.

36. The wire support system of claim 22, wherein said wire support is configured to attach to said structure in a folded configuration.

37. The wire support system of claim 25, wherein each of said one or more perf-cuts are aligned with said one or more apertures.

38. A wire support system, comprising:

an elongated member;

a wire support comprising a body having a first end, a second end, two sides, and one or more apertures configured to receive the elongated member therethrough;

a first set of mounting tabs extending from the first end of said body, said first set of mounting tabs comprising several arcuate-shaped flaps; and a second set of mounting tabs extending from the second end of said body, said second set of mounting tabs comprising several arcuate-shaped flaps.

39. A wire support, comprising:

a body having a first end and a second end, said body including a first panel and a second panel separated from the first panel by a perf-cut extending along said body, said body further including a set of slots and a set of locking tabs configured to interlock with said set of slots;

one or more apertures through said body configured to receive an elongated member therethrough, wherein said perf-cut traverses each of said one or more apertures; and one or more sets of mounting tabs extending from said body.

40. The wire support of claim 39, wherein the one or more sets of mounting tabs include a first set of mounting tabs extending from said first end of said body and a second set of mounting tabs extending from said second end of said body.

41. The wire support of claim 40, wherein the one or more sets of mounting tabs comprise arcuate-shaped flaps.

42. A wire support system, comprising:

an elongated member;

a wire support comprising a body having a first end and a second end, said wire support including one or more apertures configured to receive the elongated member therethrough; and one or more sets of mounting tabs extending from at least one of said first end and said second end, said one or more sets of mounting tabs configured to secure the wire support to a structure;

wherein each of said one or more perf-cuts are aligned with said one or more apertures.

* * * * *